United States Patent [19]
Matsuda et al.

[11] Patent Number: 5,919,973
[45] Date of Patent: Jul. 6, 1999

[54] PROCESS FOR THE POLYMERIZATION OF HEXAFLUOROPROPENE OXIDE

[75] Inventors: Takashi Matsuda; Noriyuki Koike; Shinichi Sato, all of Usui-gun, Japan

[73] Assignee: Shin-Etsu Chemical Co., Ltd., Japan

[21] Appl. No.: 08/982,524

[22] Filed: Dec. 2, 1997

[30] Foreign Application Priority Data

Dec. 2, 1996 [JP] Japan ..................................... 8336350

[51] Int. Cl.$^6$ .................................................. C07C 69/66
[52] U.S. Cl. .......................................... 560/184; 560/180
[58] Field of Search ..................................... 560/180, 184

[56] References Cited

U.S. PATENT DOCUMENTS

| | | | |
|---|---|---|---|
| 3,250,808 | 5/1966 | Moore et al. | 560/184 |
| 3,385,904 | 5/1968 | Pavlik | 560/184 |
| 4,131,740 | 12/1978 | England | 560/184 |
| 4,337,211 | 6/1982 | Ezzell et al. | 560/184 |
| 4,390,720 | 6/1983 | Resnick | 560/184 |
| 4,749,526 | 6/1988 | Flynn | 560/184 |
| 4,973,748 | 11/1990 | Strutz | 560/184 |
| 5,153,322 | 10/1992 | Flynn | 560/184 |
| 5,504,248 | 4/1996 | Krusic | 560/184 |

FOREIGN PATENT DOCUMENTS

| | | |
|---|---|---|
| 558031 | 5/1958 | Canada . |
| 2751050 | 2/1979 | Germany . |
| 1040444 | 2/1989 | Japan . |
| 184031 | 7/1994 | Japan . |

*Primary Examiner*—Paul J. Killos
*Attorney, Agent, or Firm*—Millen, White, Zelano & Branigan, P.C.

[57] ABSTRACT

The invention provides a process for polymerizing hexafluoropropene oxide in a polymerization initiator solution to produce a fluorinated polyether. The initiator solution contains a polymerization initiator of the formula: $CsOCF_2$-Rf-$CF_2OCs$ wherein Rf is a C1-C4 perfluoroalkylene group or a C2-C10 perfluoroalkylene group having an ether bond in a linear or cyclic hydrocarbon compound having at least 5 ether bonds in a molecule. An aprotic polar solvent having a melting point of lower than $-40°$ C. under atmospheric pressure is added to the initiator solution.

11 Claims, No Drawings

PROCESS FOR THE POLYMERIZATION OF HEXAFLUOROPROPENE OXIDE

This invention relates to a process for polymerizing hexafluoropropene oxide (abbreviated as HFPO, hereinafter) to produce a fluorinated polyether.

BACKGROUND OF THE INVENTION

Several processes are known in the art for the polymerization of HFPO. For example, U.S. Pat. No. 3,660,315 and JP-B 5360/1978 disclose a process for polymerizing HFPO using a tetraglyme solution of a compound of the following formula (1a) as a polymerization initiator, to thereby produce a difunctional polymer of the following formula (2a).

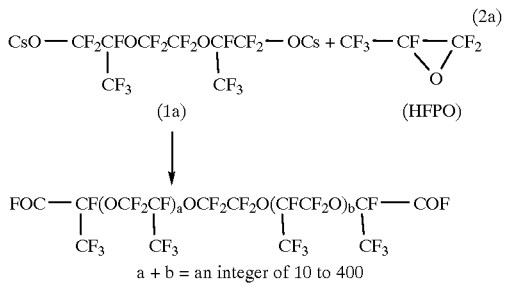

This process for the polymerization of HFPO is characterized by using a homogeneous solution which is obtained by mixing cesium fluoride, tetraglyme, and $FOCCF(CF_3)OCF_2CF_2OCF(CF_3)COF$ and removing the excess of cesium fluoride. This prevents the homopolymerization of HFPO catalyzed by the excess of cesium fluoride and eventually suppresses the formation of a monofunctional (that is, one end functional) HFPO polymer.

J. Macromol. Sci.-Chem., 48 (3), 499–520 (1974) describes that the presence of hexafluoropropene (abbreviated as HFP, hereinafter) prevents chain transfer during HFPO polymerization, thereby increasing the degree of polymerization of the resulting polymer. The effect of HFP is allegedly to prevent the chain transfer by trapping free fluoride anions.

It is important that the polymerization of HFPO be carried out under sufficient conditions to prevent the chain transfer, that is, the initiation of polymerization from a chemical species other than the initiator. To this end, the polymerization temperature should be kept as low as possible.

Well known in conjunction with the polymerization of HFPO is the tendency that as the polymerization temperature lowers, reaction selectivity increases so that the degree of polymerization of the resulting polymer increases and the formation of a monofunctional polymer (by-product) is minimized when a difunctional initiator is used.

Now that the product is a polymer, the attempt to lower the temperature, however, encounters the limited range of practically acceptable temperature because the polymerization system tends to be viscous and becomes thickened at lower temperatures. In reactors of the laboratory scale, even the contents of high viscosity can be cooled. In large-size reactors of the commercial scale, which have a relatively small heat transfer area, it is impossible to gain the same cooling efficiency as in the small-size reactors unless special means is devised for increasing the heat transfer area. More particularly, in a system of cooling the wall of a conventional cylindrical reactor, the quantity of HFPO that can be polymerized per unit time is governed by the effective heat transfer area rather than the internal volume of the reactor. Additionally, since the coefficient of heat transfer across the wall drastically drops as the contents increase the viscosity, the internal temperature rises unless the feed rate of HFPO is reduced to decrease the amount of exothermic heat (polymerization heat). On scale-up manufacture, this apparently causes serious drawbacks including an increased feed time of HFPO and a decline in product quality due to an increased polymerization temperature.

There is a desire to have a means for lowering the viscosity of a HFPO polymerization system.

SUMMARY OF THE INVENTION

Therefore, an object of the invention is to provide a novel and improved HFPO polymerizing process capable of lowering the viscosity of a HFPO polymerization system, thereby improving the efficiency of agitation and heat exchange, thereby producing a both end functional HFPO polymer of quality while minimizing a one end functional polymer.

The present invention provides a process for polymerizing hexafluoropropene oxide (HFPO) in a polymerization initiator solution to produce a fluorinated polyether. The polymerization initiator solution contains a polymerization initiator of the general formula (1):

$$CsOCF_2\text{-}Rf\text{-}CF_2OCs \qquad (1)$$

wherein Rf is a perfluoroalkylene group of 1 to 4 carbon atoms or a perfluoroalkylene group of 2 to 10 carbon atoms having an ether bond in a linear or cyclic hydrocarbon compound having at least 5 ether bonds in a molecule. An aprotic polar solvent having a melting point of lower than −40° C. (inclusive) under atmospheric pressure is added to the polymerization initiator solution. The aprotic polar solvent is effective for lowering the viscosity of the polymerization system, thereby improving the efficiency of agitation and heat exchange to reduce the polymerization time. Scale-up manufacture is thus enabled.

DETAILED DESCRIPTION OF THE INVENTION

The invention is described in more detail. The HFPO polymerizing process of the present invention is for producing a fluorinated polyether by polymerizing hexafluoropropene oxide (HFPO) in a solution of a polymerization initiator. The polymerization initiator solution contains a polymerization initiator of the general formula (1):

$$CsOCF_2\text{-}Rf\text{-}CF_2OCs \qquad (1)$$

wherein Rf is a perfluoroalkylene group of 1 to 4 carbon atoms or a perfluoroalkylene group of 2 to 10 carbon atoms having an ether bond in a linear or cyclic hydrocarbon compound having at least 5 ether bonds in a molecule.

The polymerization initiator solution may be prepared by a well-known technique as disclosed in U.S. Pat. No. 3,660,315. More particularly, it can be prepared by mixing a perfluorodicarboxylic acid fluoride represented by the general formula (2):

$$FOC\text{-}Rf\text{-}COF \qquad (2)$$

wherein Rf is as defined above, cesium fluoride and a linear or cyclic hydrocarbon compound having at least 5 ether bonds in a molecule, agitating the mixture, allowing an excess of cesium fluoride to precipitate, and separating the supernatant.

Examples of the group represented by Rf are given below.

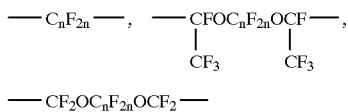

Note that n is equal to 1 to 6.

Examples of the linear or cyclic hydrocarbon compound having at least 5 ether bonds in a molecule include tetraglyme (tetraethylene glycol dimethyl ether) and crown ethers (e.g., 15-crown-5 and 18-crown-6).

Preferably the polymerization initiator solution contains the polymerization initiator of formula (1) in a concentration of 1 to 80% by weight, especially 1 to 50% by weight.

According to the feature of the invention, an aprotic polar solvent having a melting point of lower than $-40°$ C. under atmospheric pressure is added to the polymerization initiator solution for HFPO, to thereby reduce the viscosity of the polymerization system.

The aprotic polar solvent having a melting point of lower than $-40°$ C. under atmospheric pressure may be selected from various such solvents insofar as they do not adversely affect the HFPO polymerization reaction. Preferred are aprotic polar solvents which are well miscible with the polymerization initiator solution even at low temperatures of lower than $-25°$ C.

Examples of the aprotic polar solvent include N,N-dimethylformamide, N,N-dimethylacetamide, tetramethylurea, dimethylsulfoxide, hexamethylphosphoramide, acetonitrile, tetramethylsulfone, propylene carbonate, nitrobenzene, nitromethane, dimethylcyanamide, tetrahydrofuran, dioxane, and pyridine. Any of them is useful insofar as they have a melting point of lower than $-40°$ C. under atmospheric pressure. Preferred are hydrocarbon compounds having at least one ether bond, desirably 1 to 3 ether bonds, in a molecule and having a melting point of lower than $-40°$ C. under atmospheric pressure. Illustrative preferred examples include ethyl methyl ether (mp. lower.than $-70°$ C.), diethyl ether (mp. $-116°$ C.), monoglyme (ethylene glycol dimethyl ether, mp. $-58°$ C.), diglyme (diethylene glycol dimethyl ether, (mp. $-64°$ C.), and tetrahydrofuran (mp. $-108°$ C.), with the diethyl ether, monoglyme, and diglyme being especially preferred.

The aprotic polar organic solvents used herein are characterized by a greater dielectric constant $\epsilon$ and the absence of a proton donating group. They generally have rich association and great proton deformation. Thus, if used as a solvent for organic ion reaction, they exhibit significant interaction with ion reaction active species since they cancel their self-association to form a more stable solvation state.

The amount of the aprotic polar solvent added is preferably 3 to 50% by weight, more preferably 5 to 25% by weight based on the weight of the polymerization initiator solution. Less than 3% of the aprotic polar solvent would be less effective for lowering the viscosity of the polymerization system whereas more than 50% of the aprotic polar solvent would obstruct the steady progress of HFPO polymerization, increasing the formation of a by-product (monofunctional polymer).

Desirably, water is removed from the aprotic polar solvent before it is added to the polymerization initiator solution. In the practice of the invention, the aprotic polar solvent should preferably have a water content of less than 100 ppm, especially less than 50 ppm.

According to the invention, HFPO is fed to the polymerization initiator solution containing the aprotic polar solvent whereupon polymerization of HFPO is carried out. It is acceptable to simultaneously feed hexafluoropropene (HFP) to the reaction system as a means for preventing chain transfer reaction as previously mentioned.

The feed of HFPO is properly determined. Usually about 10 to 400 mol, typically about 20 to 200 mol of HFPO is fed per mol of the polymerization initiator. HFPO may be fed in either gas or liquid form, but preferably under such conditions that the internal temperature may be maintained constant. The feed time is preferably 3 to 120 hours.

The reaction temperature is usually between $-50°$ C. and $-25°$ C. At the end of polymerization, the reaction solution is aged for about 1 to 10 hours while maintaining the internal temperature between $-40°$ C. and $-25°$ C. Through subsequent heating and separation of contents, the polymer is recovered.

According to the invention, reaction of the polymerization initiator with HFPO yields a fluorinated polyether as shown below.

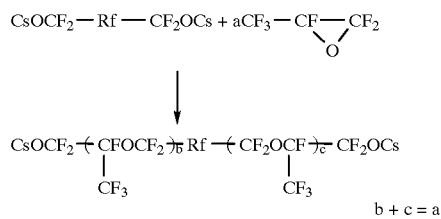

According to the invention, polymerization of HFPO is not carried out in a single solvent system of a linear or cyclic hydrocarbon compound having at least 5 ether bonds in a molecule (typically, tetraglyme), but in a mixed solvent system having added thereto an aprotic polar solvent having a melting point of lower than $-40°$ C. under atmospheric pressure (typically, diethyl ether, monoglyme, diglyme and tetrahydrofuran). As compared with the single solvent system, the mixed solvent system is effective for lowering the polymerization viscosity and hence, improving the efficiency of agitation and heat exchange, thereby effectively producing a both end functional HFPO polymer while minimizing the formation of a single end functional polymer.

EXAMPLE

Examples of the present invention are given below by way of illustration and not by way of limitation.

Example 1

A 500-ml four-necked flask equipped with a thermometer, condenser, and stirrer coupled to a torque meter was charged with 13.11 g of a tetraglyme solution containing 4.80 g of $CsOCF_2CF(CF_3)OCF_2CF_2OCF(CF_3)CF_2OCs$ and 1.97 g of diethyl ether. The flask was then cooled in a cooling bath. With the internal temperature set at $-35°$ C. and the condenser at $-50°$ C., the contents were agitated at 150 rpm. Then 10.9 g of HFP was added over 1 hour, and 109.0 g of HFPO and 58.9 g of HFP were fed over 15 hours. The internal temperature remained in the range between $-37°$ C. and $-35°$ C. for this duration. At the end of the feed, a viscosity of 4,200 centipoise was calculated from a reading of the torque meter. After the completion of the feed, agitation was continued for 2 hours at a temperature between $-37°$ C. and $-35°$ C. Thereafter, the cooling bath was removed and the internal temperature rose to $20°$ C. At this point, the unreacted HFP gasified and was purged. The flask contents were recovered as a white turbid viscous liquid in an amount of 128.3 g. To 50 g of the recovered liquid were added 50 g of methanol and 40 g of 1,3-bistrifluoromethylbenzene. The mixture was agitated at 20 to 25° C. for 30 minutes, combined with 50 g of methanol, and allowed to stand for separating into layers. The lower layer was taken out and the volatiles were removed at 20° C. and 3 mmHg, yielding 45 g of a colorless, clear, oily mixture of a difunctional HFPO polymer of the following formula (A) and a monofunctional HFPO polymer of the following formula (B). A $^{19}$F-NMR analysis showed an average degree of polymerization of 102 and a molar ratio (A)/(B) of 88/12. The results of $^{19}$F-NMR analysis are shown below together with the calculation of an average degree of polymerization and a molar ratio (A)/(B).

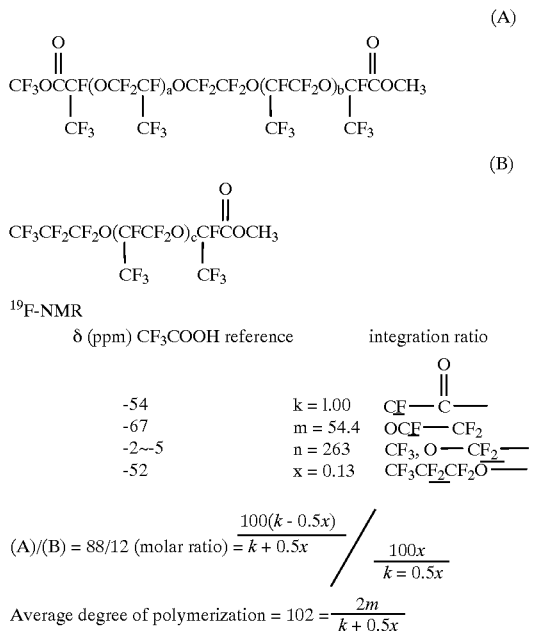

Example 2

A 500-ml four-necked flask equipped with a thermometer, condenser, and stirrer coupled to a torque meter was charged with 13.36 g of a tetraglyme solution containing 4.92 g of CsOCF$_2$CF(CF$_3$)OCF$_2$CF$_2$OCF(CF$_3$)CF$_2$OCs and 2.31 g of monoglyme. The flask was then cooled in a cooling bath. With the internal temperature set at −35° C. and the condenser at −50° C., the contents were agitated at 150 rpm. Then 11.1 g of HFP was added over 1 hour, and 111.2 g of HFPO and 59.1 g of HFP were fed over 15 hours. The internal temperature remained in the range between −37° C. and −35° C. for this duration. At the end of the feed, a viscosity of 4,800 centipoise was calculated from a reading of the torque meter. After the completion of the feed, agitation was continued for 2 hours at a temperature between −37° C. and −35° C. Thereafter, the cooling bath was removed and the internal temperature rose to 20° C. At this point, the unreacted HFP gasified and was purged. The flask contents were recovered as a white turbid viscous liquid in an amount of 130.5 g.

To 50 g of the recovered liquid were added 50 g of methanol and 40 g of 1,3-bistrifluoromethylbenzene. The mixture was agitated at 20 to 25° C. for 30 minutes, combined with 50 g of methanol, and allowed to stand for separating into layers. The lower layer was taken out and the volatiles were removed at 20° C. and 3 mmHg, yielding 44 g of a colorless, clear, oily mixture of a difunctional HFPO polymer of formula (A) and a monofunctional HFPO polymer of formula (B), both shown above. A $^{19}$F-NMR analysis showed an average degree of polymerization of 106 and a molar ratio (A)/(B) of 89/11.

Comparative Example 1

A 500-ml four-necked flask equipped with a thermometer, condenser, and stirrer coupled to a torque meter was charged with 13.35 g of a tetraglyme solution containing 4.85 g of CsOCF$_2$CF(CF$_3$)OCF$_2$CF$_2$OCF(CF$_3$)CF$_2$OCs. The flask was then cooled in a cooling bath. With the internal temperature set at −35° C. and the condenser at −50° C., the contents were agitated at 150 rpm. Then 10.6 g of HFP was added over 1 hour, and 106.5 g of HFPO and 58.3 g of HFP were fed over 15 hours. The internal temperature remained in the range between −37° C. and −35° C. for this duration. At the end of the feed, a viscosity of 28,700 centipoise was calculated from a reading of the torque meter, indicating a higher viscosity than in Examples 1 and 2. After the completion of the feed, agitation was continued for 2 hours at a temperature between −37° C. and −35° C. Thereafter, the cooling bath was removed and the internal temperature rose to 20° C. At this point, the unreacted HFP gasified and was purged. The flask contents were recovered as a white turbid viscous liquid in an amount of 124.4 g.

To 50 g of the recovered liquid were added 50 g of methanol and 40 g of 1,3-bistrifluoromethylbenzene. The mixture was agitated at 20 to 25° C. for 30 minutes, combined with 50 g of methanol, and allowed to stand for separating into layers. The lower layer was taken out and the volatiles were removed at 20° C. and 3 mmHg, yielding 44 g of a colorless, clear, oily mixture of a difunctional HFPO polymer of formula (A) and a monofunctional HFPO polymer of formula (B), both shown above. A $^{19}$F-NMR analysis showed an average degree of polymerization of 99 and a molar ratio (A)/(B) of 83/17.

Comparative Example 2

A 500-ml four-necked flask equipped with a thermometer, condenser, and stirrer coupled to a torque meter was charged with 13.29 g of a tetraglyme solution containing 4.89 g of CsOCF$_2$CF(CF$_3$)OCF$_2$CF$_2$OCF(CF$_3$)CF$_2$OCs and 1.84 g of n-hexane. The flask was then cooled in a cooling bath. With the internal temperature set at −35° C. and the condenser at −50° C., the contents were agitated at 150 rpm. Then 10.8 g of HFP was added over 1 hour, and 108.1 g of HFPO and 52.8 g of HFP were fed over 15 hours. The internal temperature remained in the range between −37° C. and −35° C. for this duration. At the end of the feed, a viscosity of 13,500 centipoise was calculated from a reading of the torque meter. After the completion of the feed, agitation was continued for 2 hours at a temperature between −37° C. and −35° C. Thereafter, the cooling bath was removed and the internal temperature rose to 20° C. At this point, the unreacted HFP gasified and was purged. The flask contents were recovered as a white turbid viscous liquid in an amount of 128.3 g.

To 50 g of the recovered liquid were added 50 g of methanol and 40 g of 1,3-bistrifluoromethylbenzene. The mixture was agitated at 20 to 25° C. for 30 minutes, combined with 50 g of methanol, and allowed to stand for separating into layers. The lower layer was taken out and the volatiles were removed at 20° C. and 3 mmHg, yielding 45 g of a colorless, clear, oily mixture of a difunctional HFPO polymer of formula (A) and a monofunctional HFPO polymer of formula (B), both shown above. A $^{19}$F-NMR analysis showed an average degree of polymerization of 103 and a molar ratio (A)/(B) of 85/15.

Table 1 summarizes the results of Examples 1–2 and Comparative Examples 1–2, that is, the viscosity of the polymerization system at the end of HFPO feed and the molar ratio of difunctional/monofunctional HFPO polymers (A)/(B).

TABLE 1

|  | E1 | E2 | CE1 | CE2 |
|---|---|---|---|---|
| Viscosity (cp) | 4200 | 4800 | 28700 | 13500 |
| (A)/(B) | 88/12 | 89/11 | 83/17 | 85/15 |

It is evident that the process of the invention is effective for lowering the viscosity of a polymerizing system and reducing the amount of a by-product (monofunctional HFPO polymer) to a level below the prior art level.

The HFPO polymerization process of the invention is successful in lowering the viscosity of a polymerizing system. This improves the efficiency of agitation and heat exchange during polymerization, thereby enabling a reduction of polymerization time and scale-up polymerization.

Japanese Patent Application No. 336350/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. In a process for polymerizing hexafluoropropene oxide in a polymerization initiator solution to produce a fluorinated polyether, the polymerization initiator solution containing a polymerization initiator of the general formula (1):

$$\text{CsOCF}_2\text{-Rf-CF}_2\text{OCs} \quad (1)$$

wherein Rf is a perfluoroalkylene group of 1 to 4 carbon atoms or a perfluoroalkylene group of 2 to 10 carbon atoms having an ether bond, in a linear or cyclic hydrocarbon compound having at least 5 ether bonds in a molecule,
 the improvement wherein an aprotic polar solvent having a melting point of lower than –40° C. under atmospheric pressure is added to the polymerization initiator solution.

2. The process of claim 1 wherein the aprotic polar solvent is a hydrocarbon compound having at least one ether bond in a molecule.

3. The process of claim 2 wherein the aprotic polar solvent is selected from the group consisting of ethyl methyl ether, diethyl ether, monoglyme, diglyme, and tetrahydrofuran.

4. The process of claim 1 wherein the aprotic polar solvent is added in an amount of 3 to 50% by weight of the polymerization initiator solution prior to the supply of hexafluoropropene oxide.

5. The process of claim 1, wherein the linear or cyclic hydrocarbon compound having at least 5 ether bonds in a molecule is tetraglyme or a crown ether.

6. The process of claim 1, wherein the polymerization initiator solution contains the polymerization initiator of the formula (1) in a concentration of 1 to 80% by weight.

7. The process of claim 1, wherein the aprotic polar solvent is added in an amount of 5 to 25% by weight of the polymerization initiator solution prior to the supply of hexafluoropropene oxide.

8. The process of claim 1, wherein the aprotic polar solvent has a water content of less than 100 ppm.

9. The process of claim 1, wherein the feed of hexafluoropropene oxide is about 10 to 400 mol per mol of the polymerization initiator.

10. The process of claim 1, wherein hexafluoropropene is simultaneously fed to the reaction with hexafluoropropene oxide.

11. The process of claim 1, wherein the reaction temperature is between –50° C. and –25° C.

* * * * *